United States Patent
Tucker et al.

(10) Patent No.: US 6,892,922 B2
(45) Date of Patent: May 17, 2005

(54) FASTENER COLLATION STRIP AND DEBRIS EXHAUST MECHANISM

(75) Inventors: Kevin M. Tucker, Chicago, IL (US); Frank K. Villari, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 27 days.

(21) Appl. No.: 10/444,314

(22) Filed: May 23, 2003

(65) Prior Publication Data

US 2004/0035906 A1 Feb. 26, 2004

Related U.S. Application Data

(62) Division of application No. 10/224,998, filed on Aug. 21, 2002, now Pat. No. 6,708,821.

(51) Int. Cl.[7] .................................................. B25C 3/00
(52) U.S. Cl. .............................. 227/136; 227/8; 227/10; 227/130; 227/119; 227/120; 227/156
(58) Field of Search ............................... 227/8, 10, 123, 227/130, 119–120, 136, 156, 142; 81/434; 206/347

(56) References Cited

U.S. PATENT DOCUMENTS

| | | | | |
|---|---|---|---|---|
| 3,904,032 A | * | 9/1975 | Maier | 206/347 |
| 4,581,964 A | * | 4/1986 | Takatsuru | 227/120 |
| 5,069,340 A | | 12/1991 | Ernst et al. | |
| 5,074,453 A | * | 12/1991 | Tachihara et al. | 227/130 |
| 5,220,123 A | * | 6/1993 | Oehry | 227/10 |
| 5,320,268 A | * | 6/1994 | Shkolnikov et al. | 227/8 |
| 5,836,732 A | | 11/1998 | Gupta et al. | |
| 5,931,622 A | | 8/1999 | Gupta et al. | |
| 5,975,399 A | * | 11/1999 | Oehri et al. | 227/136 |
| 5,988,477 A | | 11/1999 | Deieso et al. | |
| 6,055,891 A | * | 5/2000 | Habermehl | 227/136 |
| 6,145,723 A | * | 11/2000 | Gupta | 227/8 |
| 6,164,510 A | | 12/2000 | Deieso et al. | |
| 6,641,021 B2 | * | 11/2003 | Jablonski | 227/120 |
| 6,679,412 B1 | * | 1/2004 | Thomas et al. | 227/119 |

* cited by examiner

Primary Examiner—John Sipos
Assistant Examiner—Michelle Lopez
(74) Attorney, Agent, or Firm—Lisa M. Soltis; Mark W. Croll; Donald J. Breh

(57) ABSTRACT

For use in a fastener driving tool, a fastener assembly includes a plurality of fasteners arranged in a row, each fastener including a head and an elongated shank and a carrier including a plurality of connected carrier sleeves for receiving and surrounding a portion of an associated fastener. Each of the carrier sleeves includes an axis, an upper breakable portion, a middle portion, a lower breakable portion, a pedestal associated with the lower breakable portion, the pedestal axially extending away from the lower breakable collar, and a pair of notches in the lower breakable portion, the pair of notches opening toward the head of the associated fastener.

8 Claims, 6 Drawing Sheets

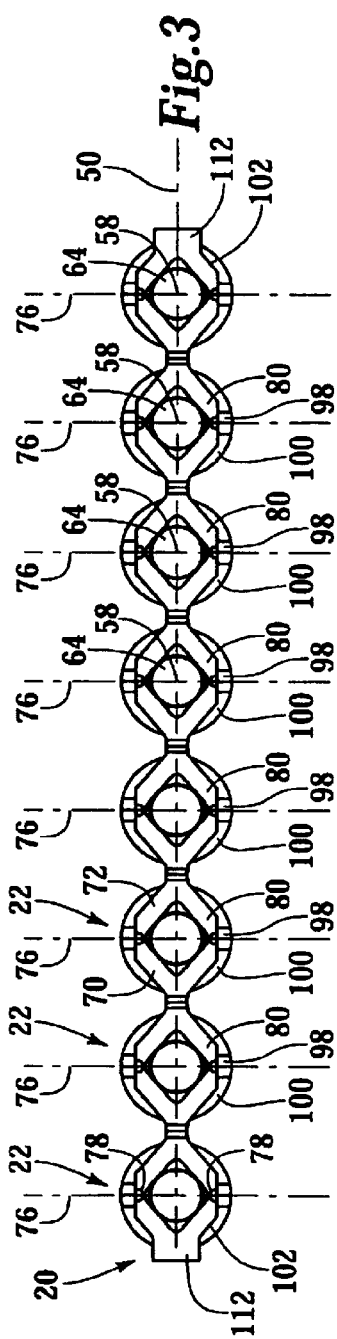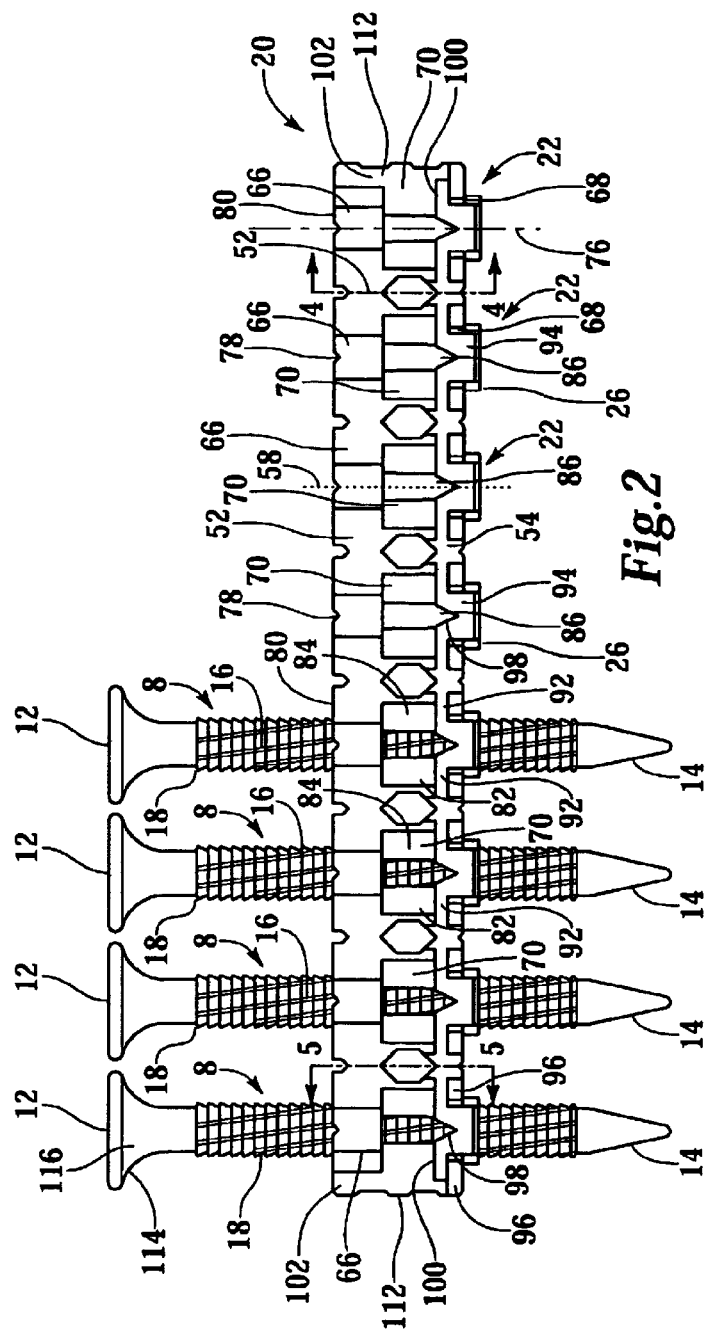

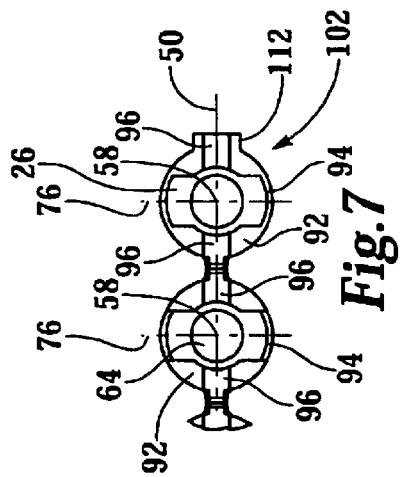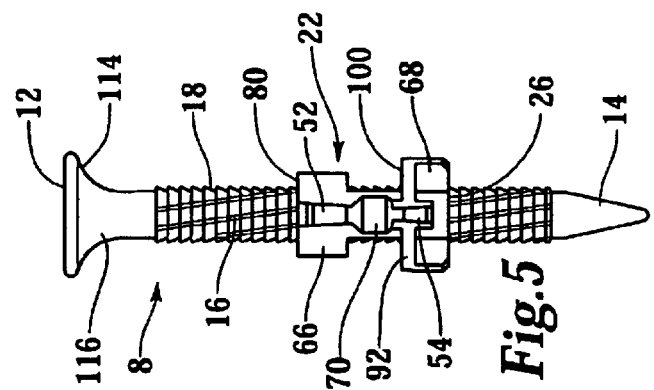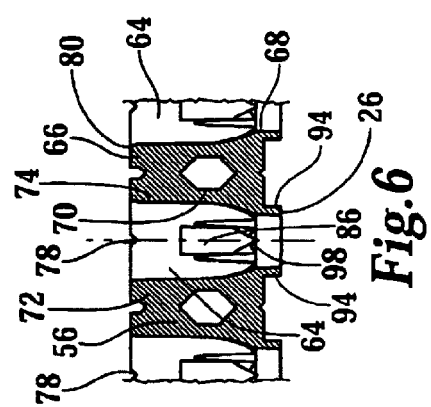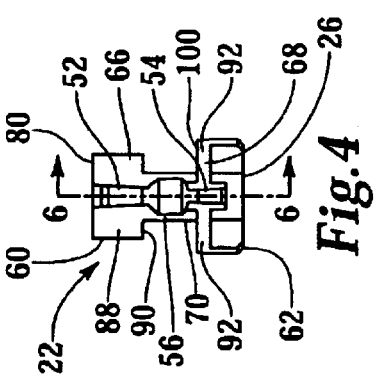

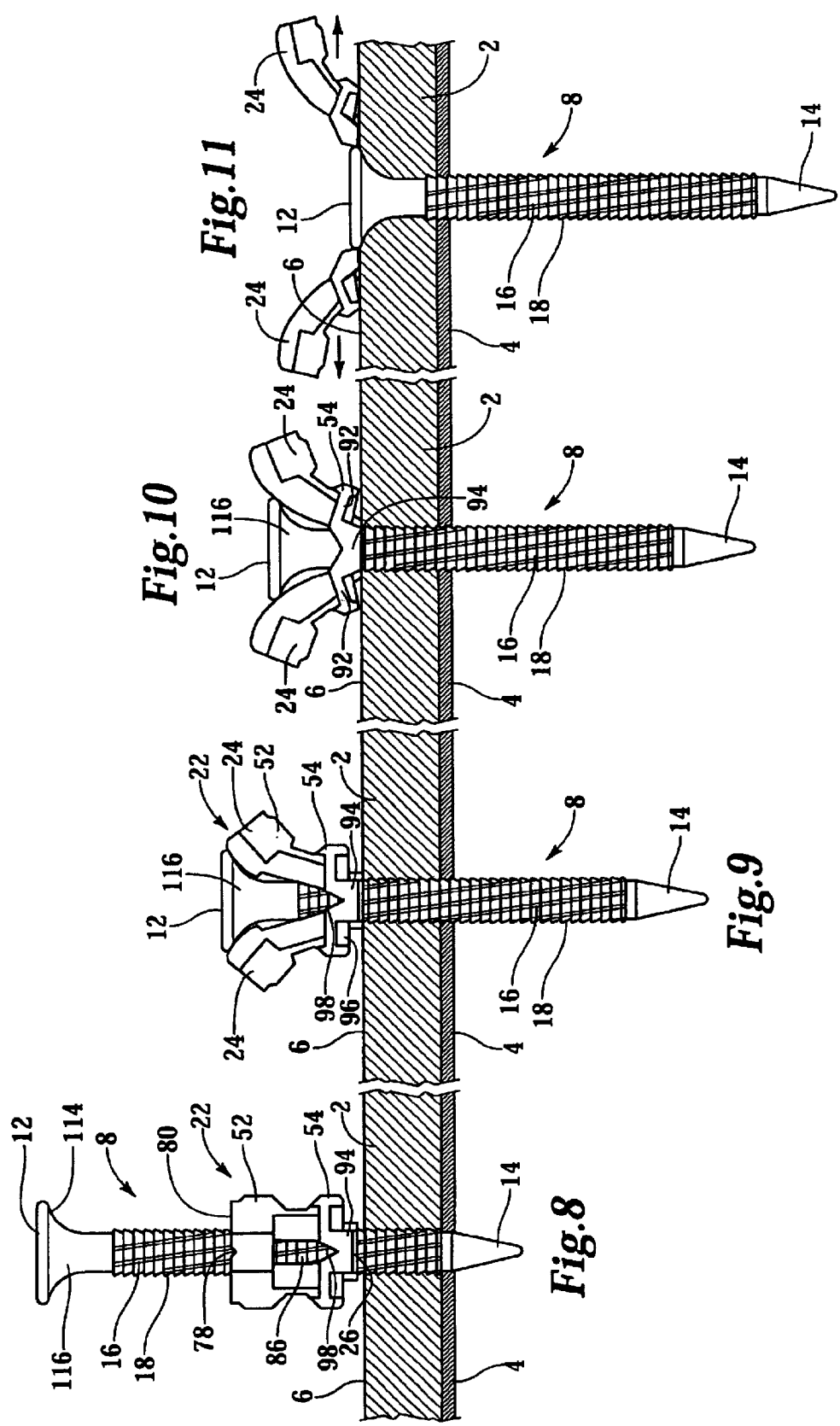

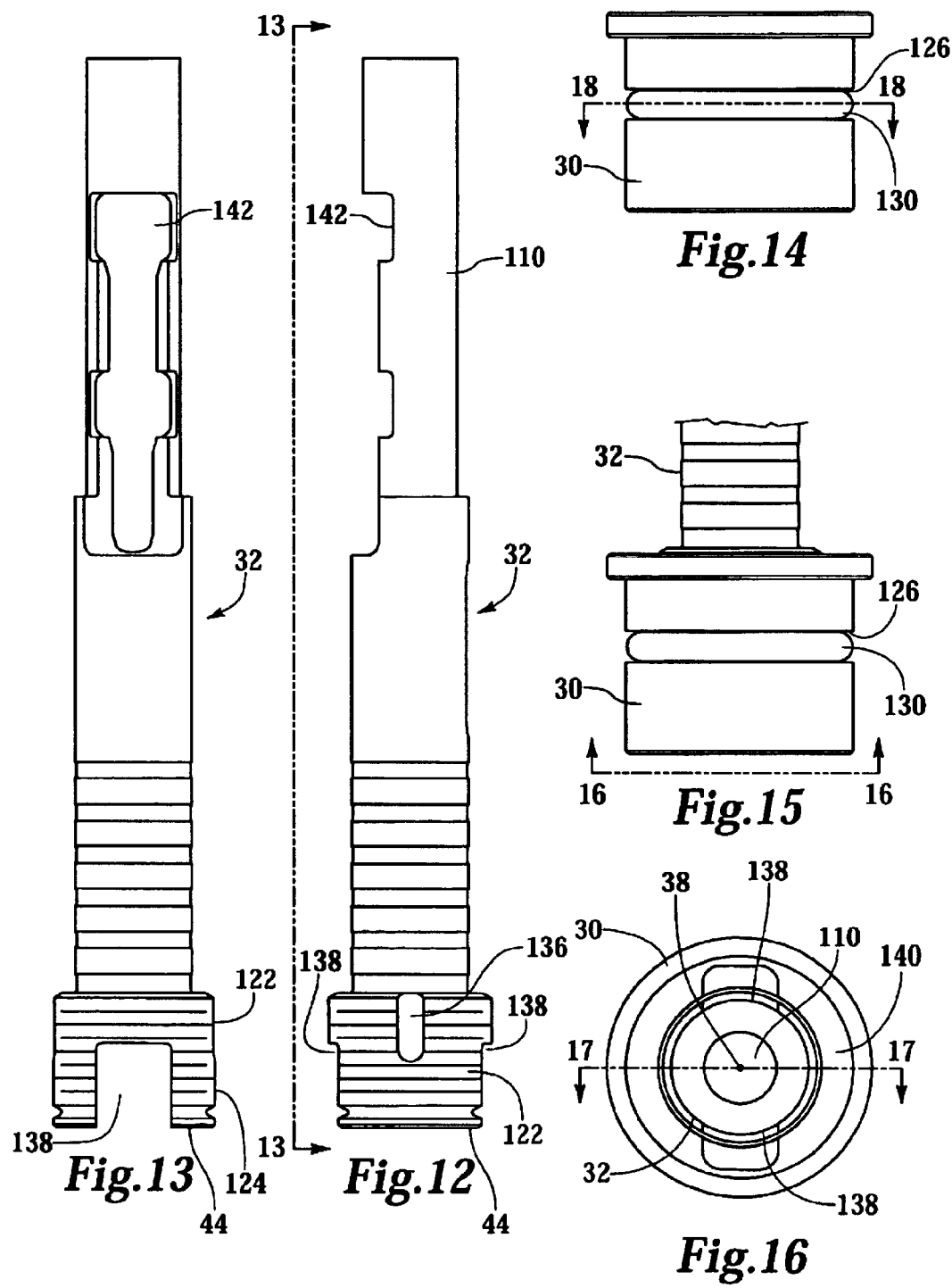

FASTENER COLLATION STRIP AND DEBRIS EXHAUST MECHANISM

This application is a Div. of Ser. No. 10/224,998 Aug. 21, 2002 U.S. Pat. No. 6,708,821.

BACKGROUND OF THE INVENTION

1. Field of the Invention

The present invention is directed to a strip of collated fasteners for a fastener driving tool.

The present invention is also directed to the exhaustion of debris from a nosepiece of the fastener driving tool.

2. Description of the Related Art

Fastener driving tools, such as combustion powered or explosive powder actuated tools are widely used for driving fasteners into substrates. Such fasteners include drive pins and nails designed to be forcibly driven into construction materials.

Fastener driving tools may use strips of collated fasteners for quick and easy feeding of fasteners to the tool. Usually, these strips are formed from a molded polymeric material with individual sleeves, bushings or holders for each of the fasteners to be collated. In most of these collation strips fillers are included to make the plastic easier to break away from the fastener when the fastener is driven by the tool. Each sleeve may have at least one frangible bridge between its neighboring sleeves to allow each sleeve to part or break away from the carrier easily. Commonly assigned U.S. Pat. No. 5,069,340 to Ernst et al. and U.S. Pat. Nos. 5,836,732 and 5,931,622 to Gupta et al., the disclosures of which are incorporated herein by reference, teach strips of collated fasteners in a set of sleeves having a portion that breaks away as the fastener is driven.

For applications such as the attachment of sheathing, such as gypsum board or plywood, to support studs it is desirable for the fastener head to be flush with the surface of the sheathing and for no residual plastic material from the collation strip to be present. As described above, many collation strips have been designed using polymeric plastics including fillers, such as talc or calcium carbonate, to cause the collation to be more brittle and break away from the fasteners easier. However, fillers can make the collation too brittle and can create problems. For example, some collation strips have been known to break in cold weather simply by dropping the collation strips. Also, many tools using the collation strips described above include a spring biased magazine follower within the magazine to push the collation toward the nosepiece of the tool. In some cases, the magazine follower has been known to break off pieces of the collation strip within the magazine, which jams the tool. Also, collation strips formed out of plastics including fillers have been know to shatter into small and irregular pieces, making clean-up of the spent sleeves difficult on the work site.

Another problem that can occur for exterior sheathing applications occurs when the sleeves do not completely break away from the fastener after the fastener has been driven into the substrate. This problem, commonly referred to as "flagging," happens when a portion of the sleeve of the collation strip becomes trapped between the head of the fastener and the surface of the sheathing. Not only can flagging cause plastic to extend away from the surface of the sheathing but it can also cause the fastener head to stand off from the surface of the sheathing, both of which are undesirable because exterior sheathing is one of the final steps in construction, and appearance is important.

Still another problem that is known using collation strips is the ejections of the broken pieces of the sleeve as the fastener is being driven. Many tools used for driving fasteners into substrates create a large amount of force. This force is transferred to the fastener so that it is driven into the substrate, but it is also transferred from the fastener to the sleeve as the fastener breaks the sleeve apart. Broken pieces of sleeves sometimes have ejected away from the nosepiece at high speeds and in various directions.

What is needed is a collation strip of fasteners for a fastener driving tool where each sleeve breaks away cleanly from the rest of the collated strip, completely breaks away from the fastener being driven, and breaks into large pieces instead of shattering into many small pieces in order to avoid jamming of the fastener driving tool.

What is also needed is a mechanism on the fastener driving tool for easily and safely exhausting collation debris from the nosepiece of the tool.

BRIEF SUMMARY OF THE INVENTION

In accordance with the present invention, a fastener assembly for use in a fastener driving tool is provided. The fastener assembly includes a plurality of fasteners arranged in a row, each fastener including a head and an elongated shank and a carrier including a plurality of connected carrier sleeves for receiving and surrounding a portion of an associated fastener. Each of the carrier sleeves includes an axis, an upper breakable portion, a middle portion, a lower breakable portion, a pedestal associated with the lower breakable portion, the pedestal axially extending away from the lower breakable collar, and a pair of notches in the lower breakable portion, the pair of notches opening toward the head of the associated fastener.

Also in accordance with the present invention, a fastener assembly for use in a fastener driving tool is provided. The fastener assembly includes a plurality of fasteners arranged in a row, each fastener including a head and an elongated shank and a carrier having a plurality of connected sleeves for receiving and surrounding a portion of each fastener. Each carrier sleeve includes a body with an axis, a first end, a second end and a bore extending axially through the body between the first and second ends, the bore being for receiving an associated fastener, a pedestal associated with the body at the second end and extending axially away from the body, a first pair of notches in the body at the first end and a second pair of notches in the body proximate the second end, wherein the first and second pairs of notches open toward the head of the associated fasteners.

Also in accordance with the present invention, a fastener driving tool with a novel mechanism for the exhaustion of debris is provided. The fastener driving tool includes a gun body having a housing and an axis, the housing enclosing a main chamber, a piston for driving a fastener into a workpiece, the piston having a head and a rod, a nosepiece connected to the gun body and extending axially in a driving direction away from the body to a distal end, the nosepiece having a pair of windows at the distal end, and a work contact element associated with the distal end of the nosepiece so that the pair of windows is surrounded by the work contact element.

These and other objects, features and advantages are evident from the following description of an embodiment of the present invention, with reference to the accompanying drawings.

BRIEF DESCRIPTION OF THE SEVERAL VIEWS OF THE DRAWINGS

FIG. 2 is a side view of a carrier of a collation strip of fasteners (with four fasteners shown).

FIG. 3 is a top view of the carrier.

FIG. 4 is a side sectional view of the carrier taken along line 4—4 of FIG. 2.

FIG. 5 is a side sectional view of the carrier and fastener taken along line 5—5 of FIG. 2.

FIG. 6 is a side sectional view of the carrier taken along line 6—6 of FIG. 4.

FIG. 7 is a bottom view of the carrier.

FIG. 8 is a side sectional view of a first step of driving the fastener into a substrate.

FIG. 9 is a side sectional view of a second step of driving the fastener into a substrate.

FIG. 10 is a side sectional view of a third step of driving the fastener into a substrate.

FIG. 11 is a side sectional view of a fourth step of driving the fastener into a substrate.

FIG. 12 is a side view of a nosepiece of the fastener driving tool.

FIG. 13 is a side view of the nosepiece taken along line 13—13 of FIG. 12.

FIG. 14 is a side view of a work contact element of the fastener driving tool.

FIG. 15 is a side view of the nosepiece engaged with the work contact element.

FIG. 16 is a bottom view of the nosepiece and the work contact element taken along line 16—16 of FIG. 15.

DETAILED DESCRIPTION OF THE INVENTION

Figure 1:
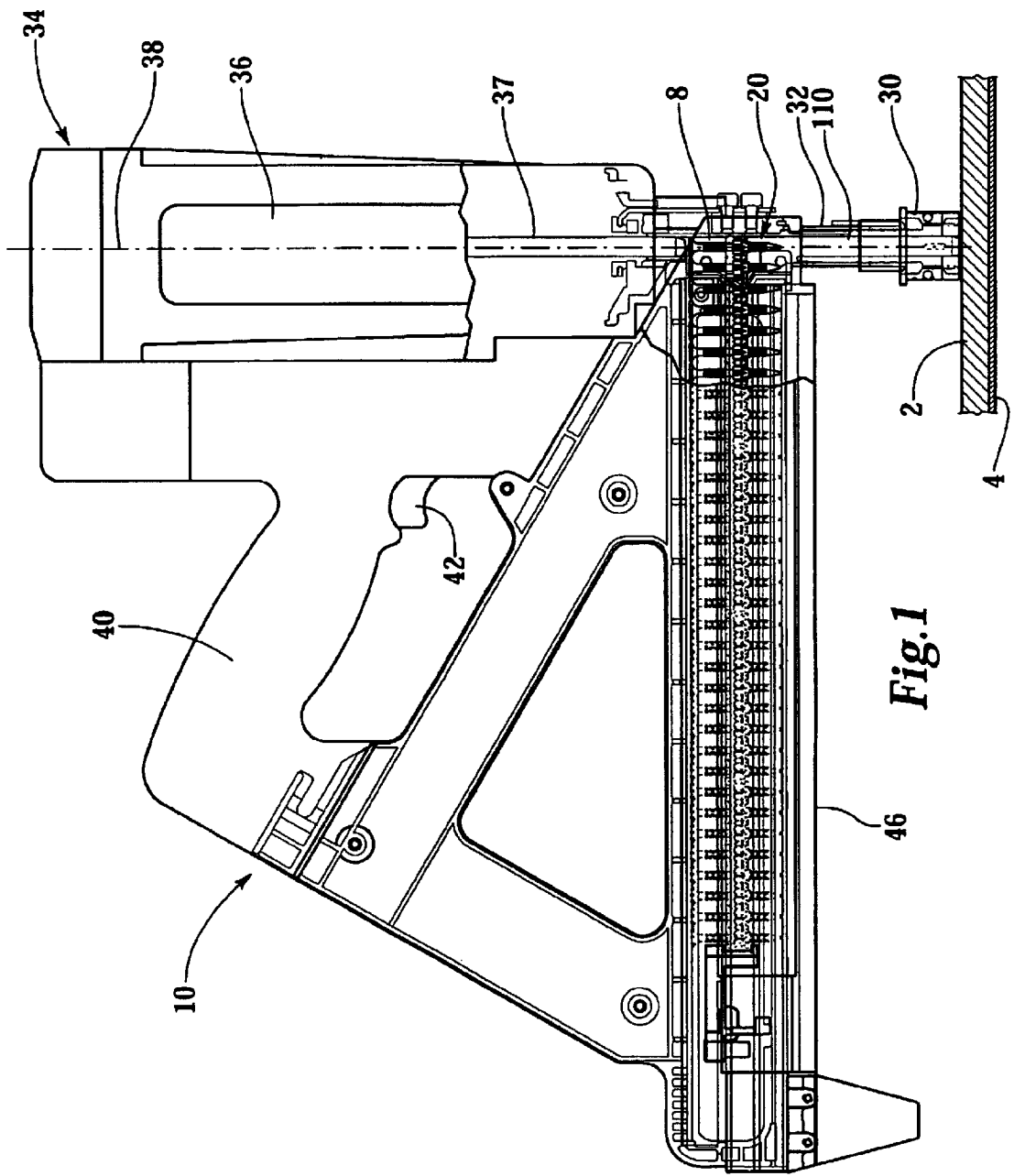
FIG. 1 is a partially cut away side view of a fastener driving tool.

A novel and inventive fastener driving tool 10 is shown in the figures. Tool 10 includes several novel features for the improved operation of attaching a substrate 2 to a support member 4 using a fastener 8. Fastener driving tool 10 uses an improved collation strip 20, also known as a carrier 20, having a plurality of sleeves 22 to hold a plurality of fasteners 8 in a row, as shown in FIG. 2. Each sleeve 22 of collation strip 20 easily breaks away from the rest of collation strip 20 when an associated fastener 8 is driven by tool 10. Each sleeve 22 also breaks into two large pieces 24 and separates from fastener 8, instead of shattering into many small and irregular pieces or being trapped between a head 12 of fastener 8 and a surface 6 of substrate 2. Fastener driving tool 10 also includes a novel and improved work contact element 30 engaged with a nosepiece 32 of tool 10. Work contact element 30 and nosepiece 32 ensure that pieces 24 of sleeve 22 are not exhausted from tool 10 until work contact element 30 is lifted off surface 6 of substrate 2.

FIG. 1 shows tool 10 being oriented so that fasteners 8 are to be driven to the right and FIGS. 2 through 11 show fasteners 8 and collation strip 20 being oriented so fasteners 8 are to be driven downwardly. However, tool 10 can be operated in several different orientations, such as to attach a substrate 2 onto vertically aligned support members 4 so that fasteners 8 are driven horizontally, or tool 10 can be operated so that fasteners 8 are driven upward to attach a substrate 2 so that it is hanging off support members 4. Therefore, any reference to the direction in which fastener 8 is driven is generally referred to as the driving direction and any reference to the opposite direction is generally referred to as the trailing direction.

Preferably, substrate 2 is sheathing used in the construction industry that is fastened to a support member 4 of a building. Examples of sheathing that can be used as substrate 2 are gypsum board such as ToughRock Sheathing or Dens-Glass Gold Gypsum manufactured by Georgia Pacific, particle board and plywood.

Support member 4 can be one of many supporting studs used in the construction industry, an example being a steel framing stud having a thickness between 20 gauge (about 0.036 inches thick) to 12 gauge (about 0.105 inches thick).

Tool 10 includes a gun body 34 having a cylinder 36 for enclosing a piston (not shown) having a driving rod 37. Gun body 34 is generally cylindrical in shape and has a central axis 38 running through the length of tool 10. The piston and driving rod 37 are also generally cylindrical in shape with the same central axis 38 as gun body 34. A handle 40 radially extends away from gun body 34 and includes a trigger 42 for actuating tool 10. Fastener driving tool 10 uses a driving force, such as pressurized air, gasoline combustion, or explosive powder, to drive the piston in the driving direction so that driving rod 37 can drive fastener 8. Also included in tool 10 is a nosepiece 32 coupled to gun body 34 and axially extending in the driving direction away from gun body 34 to a distal driving end 44. Nosepiece 32 guides driving rod 37 toward impact with fastener 8 within a barrel 110 and guides fastener 8 and driving rod 37 toward substrate 2. Nosepiece 32 is also generally cylindrical in shape having the same central axis 38 as gun body 34. A magazine 46 is connected to nosepiece 32 for feeding collation strip 20 to nosepiece 32. A work contact element 30 is threadingly engaged with nosepiece 32 at driving end 44 in order to control the driving depth of fastener 8, as described below. Work contact element 30 is also generally cylindrical in shape with the same central axis 38 as nosepiece 32, driving rod 37, and gun body 34.

An exemplary fastener 8, shown in FIG. 5, includes a head 12, a point 14, and a shank 16 axially extending between head 12 and point 14. Preferably, fastener 8 includes knurling 18 along the length of shank 16. Knurling 18 allows for much higher pullout strength so that fastener 8 can provide better attachment between substrate 2 and support member 4. Preferably, shank 16 expands radially outward at head 12 in what is commonly referred to as a bugle configuration. A bugle head 12, such as the one shown in FIG. 5, also provides for higher pullout strength and prevents tearing of substrate 2 when fastener 8 is driven. Point 14 is preferably generally conical in shape except for a slightly rounded off tip. Examples of preferred fasteners 8 are disclosed in the commonly assigned U.S. Pat. No. 5,741,104 to Lat et al. and U.S. Pat. No. 5,749,692 to Kish et al., the disclosures of which is incorporated herein by reference.

The diameter of shank 16 is preferably tapered slightly so that the diameter of shank 16 near head 12 is slightly larger than the diameter of shank 16 at point 14. The tapered shank 16 aides in the splitting of sleeve 22, describe below, as fastener 8 is driven.

Turning to FIG. 2, collation strip 20 is made up of a plurality of sleeves 22, with each sleeve 22 holding one of a plurality of fasteners 8. As one of the plurality of fasteners 8 is driven by fastener driving tool 10, a sleeve 22 associated with the fastener 8 being driven separates from its neighboring sleeve and is driven along with fastener 8 until a surface 26 of sleeve 22 nearest to point 14 comes into contact with surface 6 of substrate 2. Sleeves 22 ensure that each fastener 8 is driven in the proper orientation, perpendicular to surface 6 of substrate 2.

The plurality of sleeves 22 are integrally molded in series so that sleeves 22 may be fed into tool 10 one by one. The plurality of sleeves 22 are generally coplanar along a collation plane 50, and each adjacent pair of sleeves 22 is joined together by an upper frangible bridge 52 and a lower frangible bridge 54, which are integrally molded with collation strip 20. Bridges 52 and 54 must be strong enough to hold adjacent sleeves 22 together prior to and during loading of collation strip 20 into fastener driving tool 10, as well as during use in magazine 46 and should keep the plurality of sleeves 22 in a row and prevent the row from bending, buckling, breaking or shearing during normal handling of tool 10. However, bridges 52 and 54 must be able to readily shear so that when one of the plurality of fasteners 8 is driven by tool 10, its associated sleeve 22 is sheared from the rest of collation strip 20. In a preferred embodiment, upper bridge 52 is larger than lower bridge 54, as shown in FIG. 2, so that lower bridge 54 breaks easier than lower breakable collar 68, described below.

Each sleeve 22 includes a novel geometry that allows sleeve 22 to break into two large pieces 24 when an associated fastener 8 is driven by tool 10. Each sleeve 22 of collation strip 20 is preferably integrally formed and includes a body 56 having an axis 58, a first end 60 and a second end 62. Each sleeve includes a bore 64 axially extending through body 56 between first end 60 and second end 62, wherein bore 64 is for receiving and surrounding shank 16 of associated fastener 8. Body 56 of each sleeve 22 includes an upper breakable collar 66 at the first end and a lower breakable collar 68 at the second end. A middle portion 70 is included in each sleeve 22 between upper collar 66 and lower collar 68.

Upper collar 66 of each sleeve 22 has a generally annular shaped interior cross-section with a diameter that is slightly larger than the outer diameter of fastener shank 16 so that shank 16 fits into sleeve 22 within a predetermined tolerance. In one embodiment, shown in FIG. 3, upper collar 66 has a generally octagonal exterior cross-section which complements the interior dimensions of a magazine 46 of tool 10. The inner diameter of upper collar 66 should be sufficient to slidably receive shank 16 of fastener 8 in a tight-fitting manner. Upper collar includes two halves 72 and 74 which intersect and join at a breaking plane 76 bisecting each sleeve 22, where breaking plane 76 is perpendicular to collation plane 50. Halves 72 and 74 are generally symmetrical about breaking plane 76. Two laterally opposed notches 78 are also included in a top surface 80 of upper collar 66. In one embodiment, notches 78 are generally V-shaped and are relatively shallow with respect to the thickness of upper collar 66. Notches 78 lie generally along breaking plane 76 and open in the trailing direction toward fastener head 12 to facilitate breaking of sleeve 22 along breaking plane 76 as fastener 8 is driven through sleeve 22.

Middle portion 70 includes two walls 82 and 84 that are generally symmetrical about breaking plane 76. Middle portion 70 also includes two laterally opposed, outwardly opening windows 86 through which a portion of shank 16 emerges, as shown in FIG. 5. Windows 86 are located between walls 82 and 84 along breaking plane 76 so that sleeve 22 can continue to split along breaking plane 76 through the length of sleeve 22. Walls 82 and 84 are narrower than upper collar 66, as shown in FIG. 4, so that upper collar 66 forms extensions 88 extending laterally away from collation plane 50. Extensions 88 include a guiding surface 90 which can be used to guide collation strip 20 along magazine 46. Collation strip 20 can also be guided along magazine 46 by other guiding members, such as fastener head 12 and a top surface 100 of lower breakable collar 68.

Lower collar 68 includes relatively thin shelves 92, a thicker pedestal 94 and two tabs 96. Lower collar 68 has a generally annular interior cross-section which slidably grips shank 16 of fastener 8 in the same manner as the interior annular cross-section of the upper collar 66. The outer cross-section of shelves 92 is also generally annular in shape and has a diameter that is approximately the same as the diameter of head 12 of fastener 8. As shown in FIG. 2, pedestal 94 and tabs 96 extend axially in the driving direction from shelves 92.

Pedestal 94 is generally aligned along breaking plane 76 and tabs 96 are generally aligned along collation plane 50 so that pedestal 94 intersects with tabs 96 to form a cross-section of pedestal 94 and tabs 96 that is shaped like a cross or a plus sign, as shown in FIG. 7. Pedestal 94 has a width that is just slightly larger than the diameter of bore 64, as shown in FIG. 7, so that pedestal 94 is substantially narrower than shelves 92. Bore 64 passes through the center of pedestal 94, and tabs 96 are bisected by pedestal 94 and bore 64 so that there are two symmetrical tabs 96, one on either side of pedestal 94. As shown in FIG. 2, pedestal 94 axially extends farther from shelves 92 than tabs 96 so that pedestal 94 and tabs 96 are axially offset. In one embodiment, pedestal 94 extends approximately twice as far from shelves 92 as tabs 96 extend.

Lower collar 68 also includes two large lower notches 98 in top surface 100 of shelves 92 at windows 86, wherein lower notches 98 are similar to upper notches 78 in that they are V-shaped, but lower notches 98 are larger and extend significantly deeper into lower collar 68, as shown in FIG. 2, so that lower notches 98 extend through shelves into pedestal 94. Lower notches 98 also lie generally along breaking plane 76 and open in the trailing direction toward fastener head 12 so that both upper notches 78 and lower notches 98 lie generally along the breaking plane 76. Both lower notches 98 and upper notches 78 facilitate the splitting of sleeve 22 along breaking plane 76 so that sleeve 22 breaks into two essentially equally sized and generally symmetrical pieces 24 as fastener 8 is driven by tool 10.

Collation strip 20 can be formed out of many different materials, but it is preferred that collation strip 20 be injection molded out of a polymeric plastic material, such as a stiff polymer having a sufficiently high density. A preferred plastic would be high-density polyolefin, such as polyethylene, having a density greater than about 0.900 grams/cm$^3$, preferably greater than about 0.925 grams/cm$^3$, and still more preferably greater than about 0.945 g/cm$^3$ or greater. In order to avoid a brittle and easily breakable collation strip, particularly in cold weather, it is preferred that collation strip 20 be molded out of a polyolefin having no fillers. After collation strip 20 has been formed, such as by injection molding of a high-density polyolefin, fasteners 8 are placed into sleeves 22 by inserting fastener points 14 through bores 64 so that fastener heads 12 are in the trailing direction from upper collars 66 and fastener points 14 are in the driving direction from lower collars 68.

Although fillers are traditionally used in collation strips to allow the plastic to break away from the fastener easier, it is preferred that collation strip 20 of the present invention be essentially free of fillers to avoid shattering of collation strip 20, or breaking within magazine 46 that can jam tool 10.

When the composition of the polymer of collation strip 20 is essentially free of fillers each sleeve 22 is more difficult to break away from fastener 8 and it is imperative that each sleeve 22 be designed with geometry that allows sleeve 22 to easily split into two pieces 24. In previous collation strips, it has been known for a portion of each sleeve to become trapped and crushed between the fastener head and the surface of the substrate, so that either the fastener head stands off from the surface, or there is some residual plastic sticking out from the surface of the substrate. As described above, both of these situations are undesirable for sheathing applications because of the importance of visual appearance. Therefore, it is important that sleeve 22 splits away from fastener 8 before fastener head 12 can crush any portion of sleeve 22 between head 12 and surface 6 of substrate 2. The geometry of sleeve 22 aides in the splitting of sleeve 22, as does the tapered shank 16 of fastener 8 described above Before tool 10 is fired, collation strip 20 is placed within magazine 46 so that collation strip 20 slides along magazine 46 and feeds one sleeve 22 and fastener 8 into nosepiece 32 of tool 10 at a time. Collation strip 20 is designed so that a leading sleeve 22 and fastener 8 that are fed into nosepiece 32 are centered within barrel 110 so that the central axis 58 of sleeve 22 and fastener 8 is aligned with central axis 38 of nosepiece 32.

Magazine 46 and nosepiece 32 are designed so that sleeve 22 can only be fed into nosepiece 32 in the proper orientation to ensure that breaking plane 76 of each sleeve 22 is always in the same position. This orientation ensures that pieces 24 are always ejected away from fastener 8 at the same position of nosepiece 32, as described below.

A magazine follower (not shown) biases collation strip 20 toward nosepiece 32 so that a leading fastener 8 is centered within barrel 110 of nosepiece 32. Preferably, the magazine follower has a profile that matches a profile of an extension 112 of an end sleeve 102 so that the magazine follower provides support for collation strip 20 and prevents bending or breaking of collation strip 20. An example of a preferred magazine follower is disclosed in the commonly assigned, co-pending patent application with Attorney Docket #13769 filed contemporaneously herewith, the disclosure of which is incorporated herein by reference.

Nosepiece 32 is connected to tool 10 so that it can be in an extended position and a retracted position relative to tool 10. Nosepiece 32 is biased toward the extended position and tool 10 is designed so that it cannot be actuated unless nosepiece 32 is in the retracted position so that tool 10 cannot be fired unless work contact element 30 is pushed against substrate 2. When tool 10 is to be used, work contact element 30 is pushed against substrate 2 at a predetermined location so that nosepiece 32 is pushed into the retracted position.

When nosepiece 32 is pushed into the retracted position, a fastener support (not shown) is also pushed upwards until the fastener support comes into contact with fastener point 14, where it holds fastener 8 in a predetermined position. Once nosepiece 32 is fully retracted, tool 10 can be actuated, driving the piston and driving rod 37 in the driving direction until driving rod 37 hits fastener head 12 and begins to drive fastener 8 and sleeve 22 in the driving direction. A shearing member (not shown) is also included in tool 10 that cleanly shears bridges 52 and 54 between sleeve 22 and the rest of collation strip 20. An example of a fastener support and a shearing member are disclosed in the commonly assigned patent application entitled "Telescoping Support Device For Fastener Driving Tool," having the ITW Case #13196, the disclosure of which is incorporated herein by reference.

The steps by which fastener 8 and sleeve 22 undergo as fastener 8 is driven are shown in FIGS. 8 through 11. Fastener 8 is driven in the driving direction faster than sleeve 22 is so that shank 16 of fastener slides through bore 64 of sleeve. Because the diameter of shank 16 increases up shank 16 due to the taper described above, shank 16 acts as a wedge within sleeve 22 and creates tension along breaking plane 76. Eventually a bottom surface 114 of fastener head 12 comes into contact with upper surface 80 of sleeve 22 so that both fastener 8 and sleeve 22 move together.

Fastener 8 and sleeve 22 continue to be driven in the driving direction until bottom surface 26 of pedestal 94 comes into contact with surface 6 of substrate 2. At this point, sleeve 22 cannot be driven in the driving direction any farther, but fastener 8 continues to be driven into substrate 2. The tapered portion 116 of bugle head 12 acts as a wedge to split sleeve 22 into two pieces 24 along breaking plane 76, as shown in FIGS. 9 through 11.

Fastener 8 continues to be driven in the driving direction by tool 10 and bugle head 12 continues to wedge between the two pieces 24 of sleeve 22 that are formed as sleeve 22 splits. Because pedestal 94 is narrower than shelves 92, it allows each piece 24 of sleeve 22 to bend away from fastener 8 so that shelves 92 begin to bend towards substrate 2, as shown in FIG. 10. As fastener 8 is driven in the driving direction, fastener head 12 forces pieces 24 outward, and the bending described above causes pieces 24 to peel away from fastener 8. Larger lower notches 98 also aide in this peeling because pieces 24 can start bending and peeling away from fastener 8 before lower collar 68 begins to split. The fact that pedestal 94 is offset from tabs 96 also allows pieces 24 to bend away from fastener 8 because pedestal 94 acts as a pivot for each piece 24 as it bends away from fastener 8.

Fastener head 12 continues to split sleeve 22 into two pieces 24 along breaking plane 76 by splitting lower collar 68 at lower notches 98. When fastener head 12 is driven to surface 6 of substrate 2, sleeve 22 completely splits into the two pieces 24 which are ejected outwardly away from fastener 8, as shown in FIG. 11.

As described above, it is important that no portion of sleeve 22 become trapped and crushed between fastener head 12 and substrate 2 because it would prevent fastener head 12 from being flush with surface of substrate 2. Similarly, it is important that tool 10 drives fastener 8 to the appropriate depth so that fastener head 12 will be flush with surface 6. Because support member 4 or substrate 2 can be of varying thicknesses, it is important that tool 10 be able to adjust its depth of drive in order to compensate for these differences in thickness, or for any other factors that may affect the driving depth of fastener 8.

Nosepiece 32 of tool 10 includes an adjustable work contact element 30 adjustably connected to nosepiece 32. In one embodiment, work contact element 30 is generally cylindrical in shape with barrel 110 passing through the center of work contact element 30. Work contact element 30 includes threading 118 on an interior surface 120 that corresponds to threading 122 on an outer surface 124 of nosepiece 32 so that nosepiece 32 fits radially within work contact element 30. The driving depth of tool 10 is adjusted by rotating work contact element 30 which causes work contact element threading 118 to engage nosepiece threading 122 so that work contact element 30 moves axially with respect to nosepiece 32 either in the driving direction or the trailing direction, depending on which direction work contact element 30 is rotated so that the effective length of nosepiece 32 and work contact element 30 is adjusted.

It may be desirable for the depth of drive to be adjustable at discrete intervals such as in increments of 0.001 inches. Discrete adjustment is desirable because it allows operators to know how far they have adjusted the driving depth of tool 10. In order to allow for discrete adjustment, work contact element 30 includes an annular groove 126 in exterior surface 128 for retaining an annular elastomeric o-ring 130. Holes 132 are included in groove 126 that are evenly spaced from each other. Each hole 132 extends through work contact element 30 and is sized to retain a bearing 134 which emerges from work contact element 30 and extends radially inward toward nosepiece 32. Nosepiece 32 also includes evenly spaced channels 136 that interrupt threading 122 on nosepiece, wherein channels 136 correspond to holes 132 and bearings 134.

When work contact element 30 and nosepiece 32 are assembled, o-ring 130 biases bearings 134 toward nosepiece 32. In a first position, work contact element 30 is in a position so that bearings 134 are nested within channels 136. When work contact element 30 is rotated, holes 132 push bearings 134 until bearings 134 are eventually forced out of channels 136. Work contact element 30 can then be freely rotated until work contact element 30 has been rotated so that each bearing 134 encounters the next channel 136. As work contact element 30 is rotated, o-ring 130 continues to bias bearings 134 toward nosepiece 32 so that when each bearing 134 encounters a channel 136, bearing 134 is forced into the channel 136. As bearings 134 settle into channels 136, the operator can feel and hear a "click" which indicates that work contact element 30 has rotated to a set position. In this way an operator can rotate work contact element 30 and know how far it has been adjusted with respect to nosepiece 32, because each position corresponds to a discrete distance.

Figure 18:
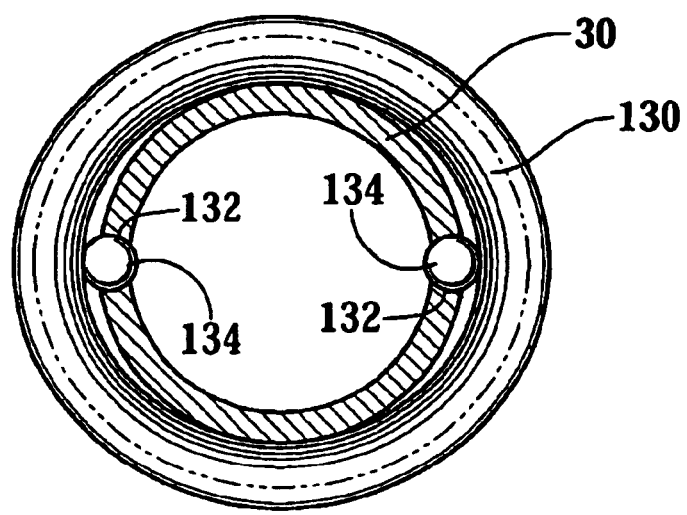
FIG. 18 is a sectional view of the work contact element taken along line 18—18 of FIG. 14.

In one embodiment, shown in FIG. 18, work contact element includes two opposed holes 132, evenly spaced at about 180° from each other. Two bearings 134 are retained within holes 132, and two opposed channels 136 are included in nosepiece 32, wherein channels 136 are evenly spaced at about 180° from each other. The driving depth of tool 2 is adjusted by rotating work contact element 30 with respect to nosepiece 32, as described above. With each half-rotation of about 180°, a bearing 134 moves from one channel 136, to the opposite channel 136, and the operator feels the "click" described above.

However, the present invention is not limited to a work contact element having two opposed holes. One of ordinary skill in the art would recognize that a work contact element having three evenly spaced holes, each hole being approximately 120° from its neighboring holes, with three bearings and three channels in the nosepiece which are also spaced at about 120° would be equivalent, and would still fall under the broad scope of the present invention. Similarly, a work contact element having four or more generally evenly spaced holes with corresponding bearings and channels would also fall under the scope of the present invention.

As described above, as fastener 8 is driven in the driving direction by tool 10, it splits sleeve 22 into pieces 24 with a great deal of force, causing pieces 24 to be ejected away from fastener 8. Although it is preferred that pieces 24 are cleared away from fastener 8 so that no portion of sleeve 22 can be trapped and crushed between fastener head 12 and substrate 2, it is undesirable to have pieces 24 uncontrollably ejected away from tool 10 at high speeds, which is common with the high forces of tool 10. In order to ensure that pieces 24 are fully separated from fastener 8, while still not ejecting away from tool 10, novel and improved work contact element 30 and nosepiece 32 include modifications to prevent the ejection from tool 10.

As discussed above, nosepiece 32 is threadingly engaged radially within work contact element 30 so that work contact element 30 may be axially adjusted by rotating work contact element 30 with respect to nosepiece 32. Therefore, work contact element 30 has an inside diameter that is larger than nosepiece 32 so that work contact element 30 cannot guide sleeve 22 and fastener 8 as effectively as nosepiece 32 because the smaller diameter of barrel 110 does not run through work contact element 30. Therefore it is desirable for nosepiece 32 to extend as far in the driving direction as possible to ensure that fastener 8 is guided as it is being driven by tool 10.

To ensure that nosepiece 32 does not interfere with the separation of pieces 24 from fastener 8, nosepiece 32 includes two opposed windows 138 at driving end 44 of nosepiece 32 corresponding to pieces 24 of sleeve 22. In one embodiment, shown in FIG. 13, each window 138 is generally rectangular in shape and is sized so that a piece 24 will easily fit through window 138. Windows 138 are positioned on nosepiece 32 so that they lie along a plane that is perpendicular to the breaking plane 76 of sleeve 22 so that pieces 24 are ejected through windows 138.

To ensure that breaking plane 76 of each sleeve 22 is aligned properly so that pieces 24 will eject through windows 138, an opening 142 in nosepiece 32 is included so that each sleeve 22 will be fed through nosepiece 32 into barrel 110 in the proper orientation. Opening 142 is shaped so that sleeve 22 and fastener 8 can only fit through in one way, so that if either sleeve 22 or fastener 8 is improperly aligned, sleeve 22 will not fit through opening 142. Opening 142 lies generally along collation plane 50 so that collation strip 20 will feed into opening 142. Windows 138 also lie generally in collation plane 50 so that when sleeve 22 breaks along breaking plane 76, which is perpendicular to collation plane 50, pieces 24 will eject through windows 138. When sleeve 22 and fastener 8 are properly aligned they can pass through opening 142 into a barrel 110 in nosepiece 32.

Figure 17:
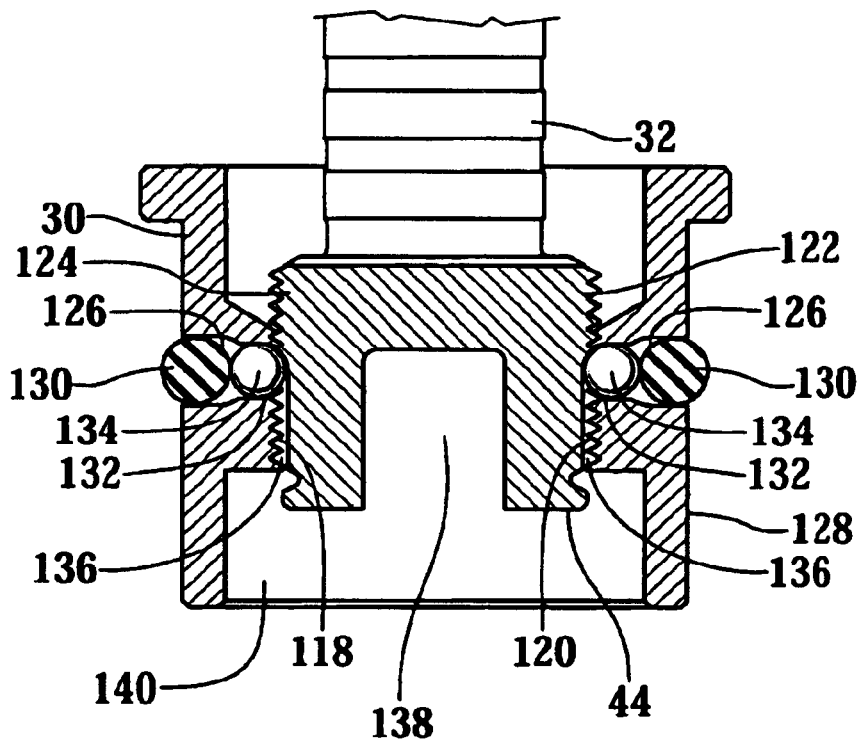
FIG. 17 is a side sectional view of the nosepiece and the work contact element taken along line 17—17 of FIG. 16.

To prevent pieces 24 from ejecting away from tool 10, work contact element 30 is designed to stop pieces 24 from exiting a chamber 140 formed within work contact element 30 while work contact element 30 is pressed against substrate 2. The inside diameter of work contact element 30 at chamber 140 is significantly larger than the outside diameter of nosepiece 32 within chamber 140, as shown in FIGS. 16 and 17. Before a tool 10 is fired, work contact element 30 must be pressed against substrate 2 to engage tool 10, as described above. When work contact element 30 is pressed against substrate 2, chamber 140 is completely contained by surface 6 of substrate 2 in one direction, and by work contact element 30 in all other directions. When tool 10 is fired, the piston drives fastener 8 and sleeve 22 in the driving direction, as described above, so that fastener 8 splits sleeve 22 into two pieces 24.

The pieces 24 eject away from fastener 8 due to the force of tool 10 and pass through windows 138 in nosepiece 32 and into chamber 140 between nosepiece 32 and work contact element 30. Pieces 24 continue to eject outward until they strike work contact element 30. Pieces 24 settle within chamber 140 due to gravity, where they remain until work contact element 30 is pulled away from substrate 2. When tool 10 is removed from substrate 2, pieces 24 are able to fall freely out of chamber 140.

The novel and improved work contact element 30 and nosepiece 32 of the present invention not only prevents pieces 24 from flying away from tool at a high speed, but also help to control where spent pieces 24 of sleeve 22 will fall. In this way, it is easier for an operator to clean up a work site after using tool 10 of the present invention, because pieces 24 simply fall downward due to gravity instead of flying off in less predictable directions.

The inventive fastener driving tool of the present invention provides improved performance of attachment between a substrate and a support member by providing a collation strip of sleeves for holding fasteners that is less prone to breaking within magazine, less prone to shatter into many small pieces, and that breaks into two large uniform pieces that easily split away from the fastener without being trapped and crushed between the fastener head and the substrate. The inventive tool also includes an improved nosepiece and work contact element which allows for depth adjustment, and provides increased safety by preventing the pieces of the sleeve from flying away from the tool.

The present invention is not limited to the above-described embodiments, but should be limited solely by the following claims.

What is claimed is:

1. A fastener driving tool for driving fasteners carried by corresponding sleeves of a collation into a substrate, said tool comprising:
    a gun body having a housing and an axis, the housing enclosing a main chamber;
    a piston for driving a fastener into a workpiece, the piston having a head and a rod;
    a nosepiece connected to the gun body and extending axially in a driving direction away from the gun body to a distal end, the nosepiece having a pair of windows at the distal end, the nosepiece configured for receiving the piston rod and for guiding the piston rod and the fastener toward the workpiece; and
    a work contact element for pushing against the workpiece, the work contact element being associated with the distal end of the nosepiece so that the pair of windows is surrounded by the work contact element;
    wherein the work contact element has an inner surface that is spaced apart from an outer surface of the nosepiece at the windows by an amount sufficient to create a chamber for receiving pieces of a corresponding sleeve ejected through said windows.

2. A fastener driving tool according to claim 1, wherein the work contact element is threadingly engaged with the nosepiece so that the work contact element can be axially adjusted with respect to the nosepiece.

3. A fastener driving tool according to claim 1, wherein the windows are spaced about 180° apart.

4. A fastener driving tool according to claim 1, wherein the work contact element is generally cylindrical in shape.

5. A fastener driving tool according to claim 1, wherein the nosepiece includes an opening for feeding fasteners into the nosepiece between the gun body and the work contact element.

6. A fastener driving tool according to claim 5, wherein the opening is shaped to receive the fasteners in a predetermined orientation so that the fasteners are driven properly.

7. A fastener driving tool according to claim 5, wherein the opening lies generally along a plane, and wherein the pair of windows lie generally along the plane.

8. A fastener driving tool for driving fasteners carried by corresponding sleeves into a substrate, said tool comprising:
    a gun body having a housing and an axis, the housing enclosing a main chamber;
    a piston for driving a fastener into a workpiece, the piston having a head and a rod
    a nosepiece connected to the gun body and extending axially in a driving direction away from the gun body to a distal end, the nosepiece having a pair of windows at the distal end, the nosepiece configured for receiving the piston rod and for guiding the piston rod and the fastener toward the workpiece; and
    a work contact element associated with the distal end of the nosepiece so that the pair of windows is surrounded by the work contact element, wherein the work contact element has an inner surface that is spaced apart from an outer surface of the nosepiece at the windows by an amount sufficient to create a chamber for receiving pieces of a corresponding sleeve ejected through said windows.

* * * * *